(12) United States Patent
Lo et al.

(10) Patent No.: US 7,961,408 B2
(45) Date of Patent: Jun. 14, 2011

(54) FIVE-LENS IMAGE LENS SYSTEM

(75) Inventors: Chih-Wei Lo, ChungHo (TW); Yun-Chiang Hsu, ChungHo (TW)

(73) Assignee: Create Electronic Optical Co., Ltd., Chung Ho, Taipei Hsien (TW)

( * ) Notice: Subject to any disclaimer, the term of this patent is extended or adjusted under 35 U.S.C. 154(b) by 0 days.

(21) Appl. No.: 12/068,759

(22) Filed: Feb. 11, 2008

(65) Prior Publication Data
US 2011/0096413 A1    Apr. 28, 2011

(51) Int. Cl.
*G02B 13/04*    (2006.01)
(52) U.S. Cl. .................. 359/753; 359/714; 359/770
(58) Field of Classification Search .............. 359/646, 359/659, 714, 717, 749, 753, 754, 763, 770, 359/793
See application file for complete search history.

(56) References Cited

U.S. PATENT DOCUMENTS
7,486,449 B2 * 2/2009 Miyano ............... 359/781
7,852,572 B2 * 12/2010 Robinson ............. 359/753
* cited by examiner

*Primary Examiner* — Darryl J Collins
(74) *Attorney, Agent, or Firm* — Muncy, Geissler, Olds & Lowe, PLLC

(57) ABSTRACT

A five-lens image lens system is revealed. The five-lens image lens system includes a first lens group with a negative power and a second lens group with a positive power. Along an optical axis in order from an object plane to an image plane, the first lens group includes a negative first lens and a negative second lens while at least one of optical surfaces of the first lens and the second lens is an aspherical optical surface. The second lens group includes a positive third lens, a positive fourth lens, and a negative fifth lens from the object plane to the image plane while an image-side lens surface of the positive fourth lens is glued with an object-side lens surface of the negative fifth lens. The image lens system satisfies the following conditions: 2R2>R4>R2, 2|F12|<|F34|, and Vd1>Vd2, Vd4>Vd5; wherein R2, R4 respectively represent curvature radius of the image-side lens surface of the negative first lens and the negative second lens; f12, f34 respectively represent focal length of the negative first lens and the negative second lens; Vd1, Vd2, Vd4, Vd5 respectively are Abbe numbers of the first lens, the second lens, the fourth lens, and the fifth lens. Thus the image lens system has features of wide viewing angle, small Fno, high brightness, high resolution, and effectively minimized length (through the lens, TTL). Therefore, the applications and effects of the image lens system are improved and especially suitable for lens of EDR (Event Data Recorder) of car safety systems.

13 Claims, 15 Drawing Sheets

FIVE-LENS IMAGE LENS SYSTEM

BACKGROUND OF THE INVENTION

The present invention relates to a five-lens image lens system, especially to a compact lens system applied to EDR (event data recorder) of the car monitoring devices with features of wide viewing angle, smaller Fno (F number), high resolution, and short total length.

Generally, a light path formed by at least one lens or lens group, in combination with an image sensing chip such as CCD (Charge Coupled Device) or CMOS (Complementary Metal-Oxide Semiconductor) arranged on the same optical axis forms an image lens system. The image lens system may be single-lens type, double-lens type or triple-lens type. While capturing images, light from the object passes through each lens or lens group to form an image on the image sensing chip for being converted into signals that are sent to related peripheral devices. Furthermore, an IR cut-off filter is disposed in front of the image sensing chip. Or a membrane is plated on an image-side lens surface of the lens prior to the image sensing chip so as to replace the IR cut-off filter. The above image lens system is broadly applied to various monitoring systems such as car safety systems, working as the image lens of the EDR (Event Data Recorder) such as car DVR (Digital Video Recorder). However, such object lens of the monitoring systems, especially for EDR, generally has following shortcomings: limited viewing angle that has negative effects on viewing angle and range of the images being captured; larger Fno that affects brightness and resolution of the images, especially the images captured in the dark; longer total length (or height) caused by the size of the image sensing chip. Once the total length can't be minimized effectively, the volume of the lens can't be reduced and the manufacturing cost also can't be decreased. Thus effects, applications or competitiveness of the image lens system are affected. Therefore, there is a space for improvement of the image lens system applied to monitoring systems, especially EDR.

SUMMARY OF THE INVENTION

Therefore it is a primary object of the present invention to provide a five-lens image lens system that includes a first lens group with a negative power and a second lens group with a positive power. Along an optical axis in order from an object plane to an image plane, the first lens group includes a negative first lens and a negative second lens while the second lens group includes a positive third lens, a positive fourth lens, and a negative fifth lens. At least one of optical surfaces of the first lens and the second lens is an aspherical optical surface and an image-side lens surface of the positive fourth lens is glued with an object-side lens surface of the negative fifth lens. Thus the lens system has wide viewing angle such as at least 110°, small Fno, high brightness and high resolution. The applications and effects of the image lens systems are improved.

It is another object of the present invention to provide a five-lens image lens system that satisfy following conditions:

$2R2 > R4 > R2;$ $2|F12| < |F34|;$ and $Vd1 > Vd2, Vd4 > Vd5;$ wherein R2, R4 respectively represent curvature radius of the image-side lens surface of the negative first lens and the negative second lens; f12, f34 respectively represent focal length of the negative first lens and the negative second lens; Vd1, Vd2, Vd4, Vd5 respectively are Abbe numbers of the first lens, the second lens, the fourth lens, and the fifth lens. Thereby, total length of the image lens system is effectively minimized and is able to be applied to ¼" CCD, CMOS or image sensing chips even smaller in size so that the volume is reduced and the applications are improved.

DETAILED DESCRIPTION OF THE PREFERRED EMBODIMENT

Figure 1:
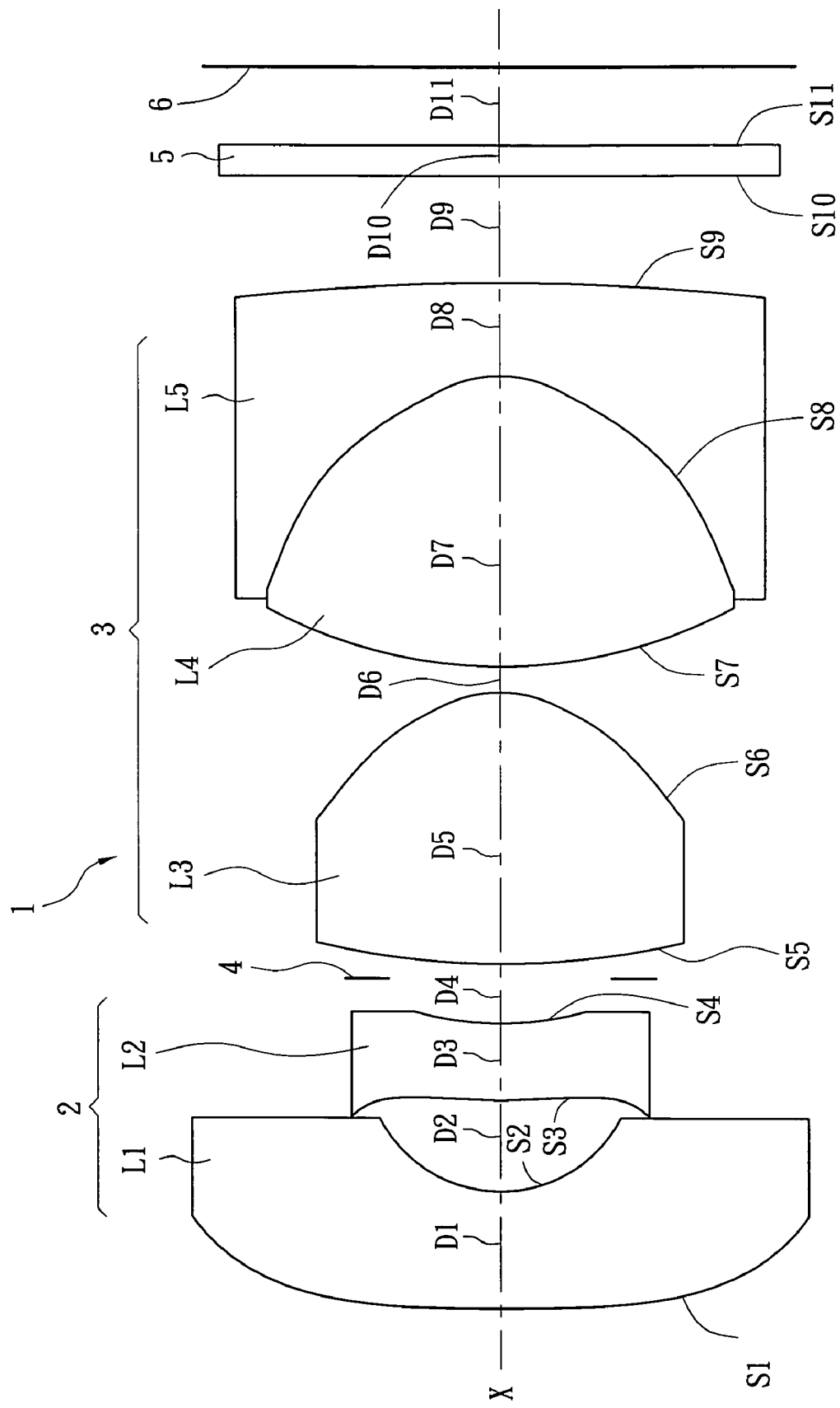
FIG. 1 is a schematic drawing of an optical structure of an embodiment according to the present invention.
Figure 2:
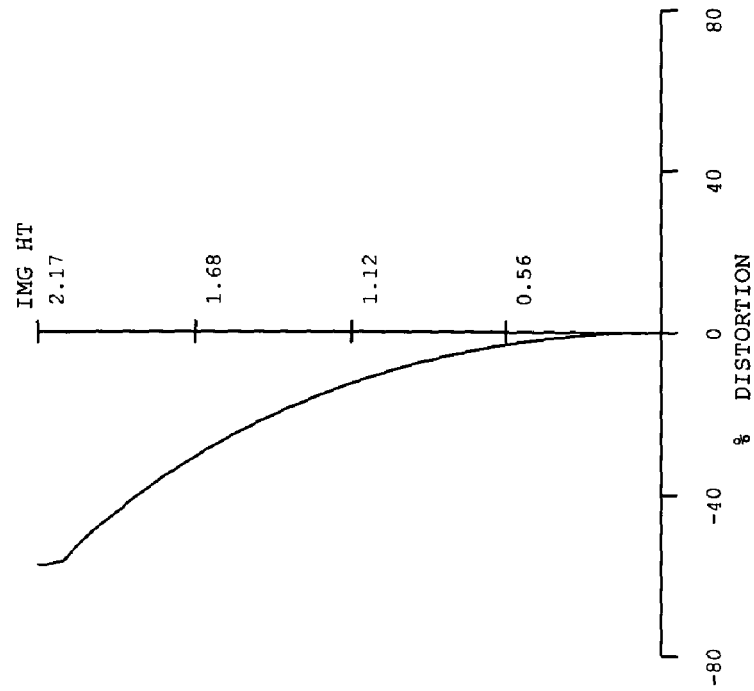
FIG. 2 shows Astigmatic field curvature of an image of an embodiment according to the present invention.
Figure 3:
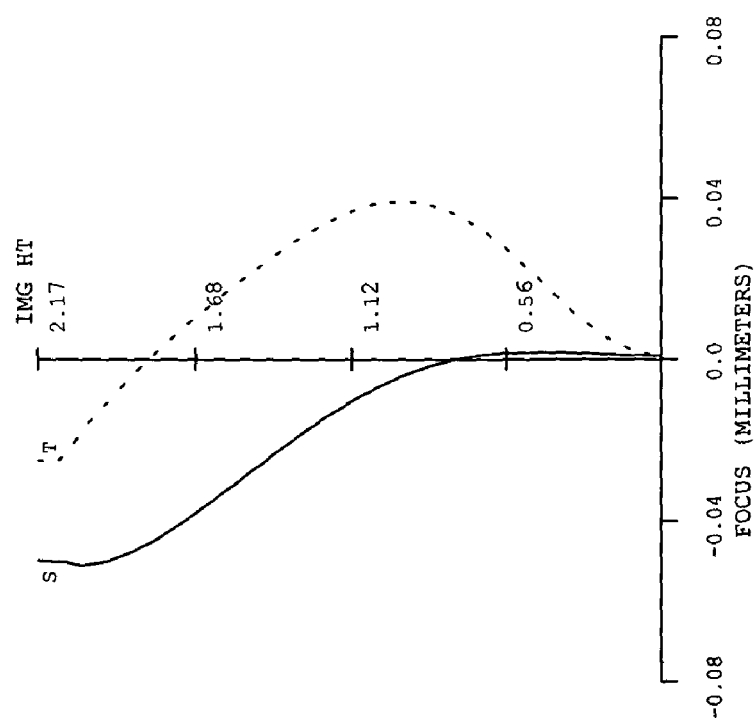
FIG. 3 shows distortion of an image of an embodiment according to the present invention.
Figure 4:
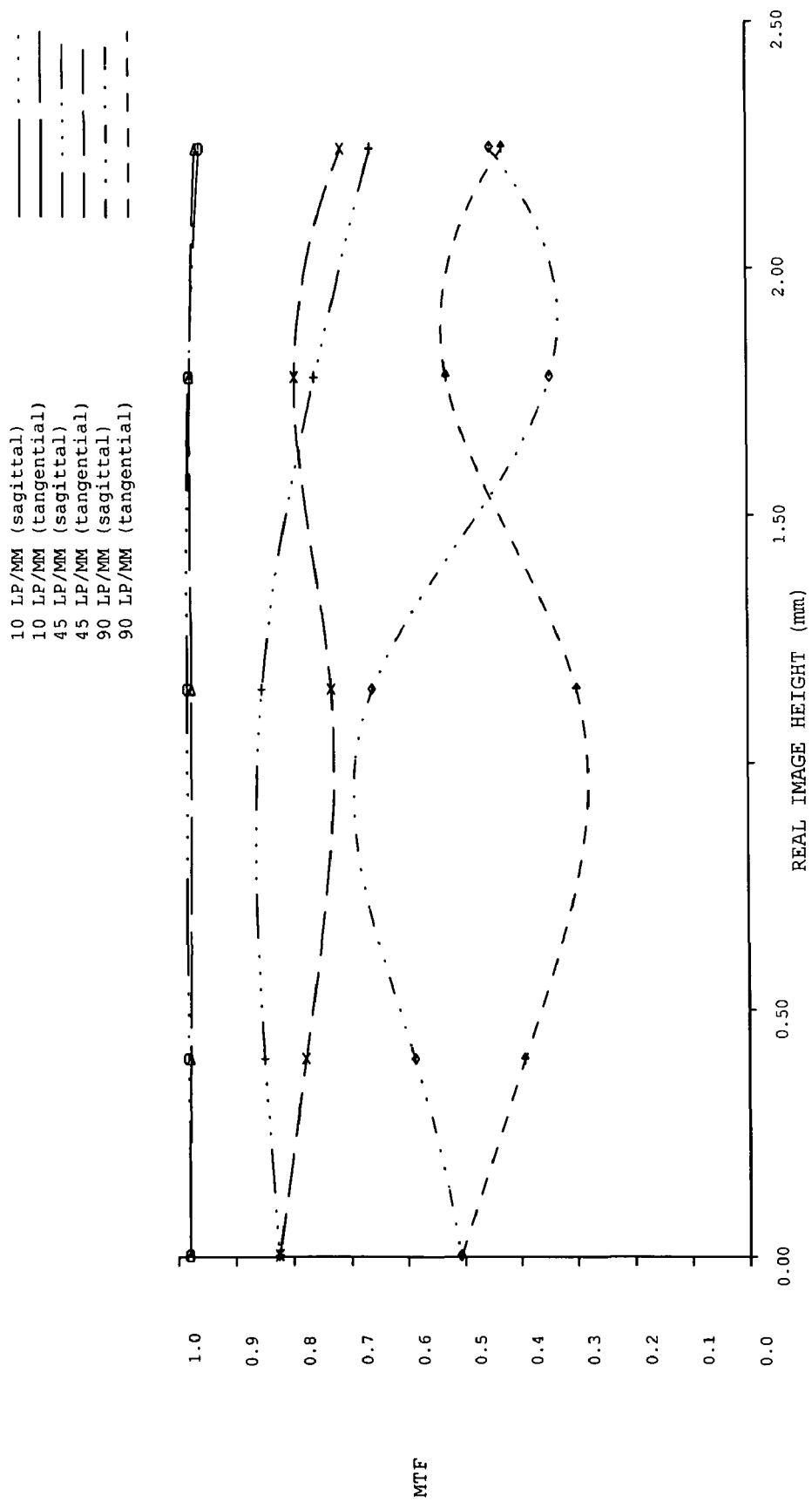
FIG. 4 shows a chart of 6 different Line pair (10 LP/mm (sagittal), 10 LP/mm (tangential), 45 LP/mm (sagittal), 45 LP/mm (tangential), 90 LP/mm (sagittal), 90 LP/mm (tangential)) per picture height ranging from 0 to 2.24 mm (vertical axis) vs MTF (Modulation transfer function) (horizontal axis) of an embodiment according to the present invention.
Figure 5:
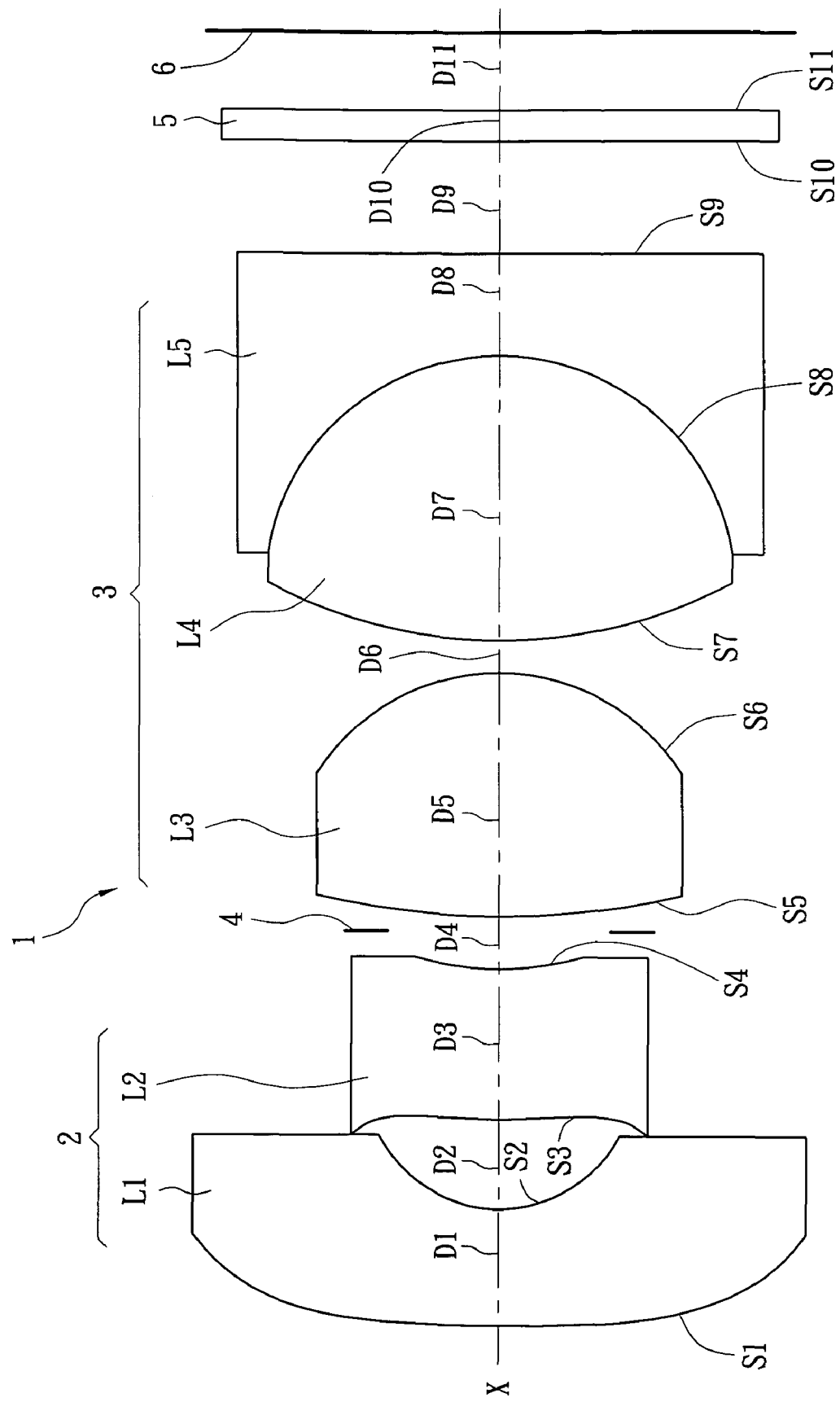
FIG. 5 is a schematic drawing of an optical structure of another embodiment according to the present invention.
Figure 6:
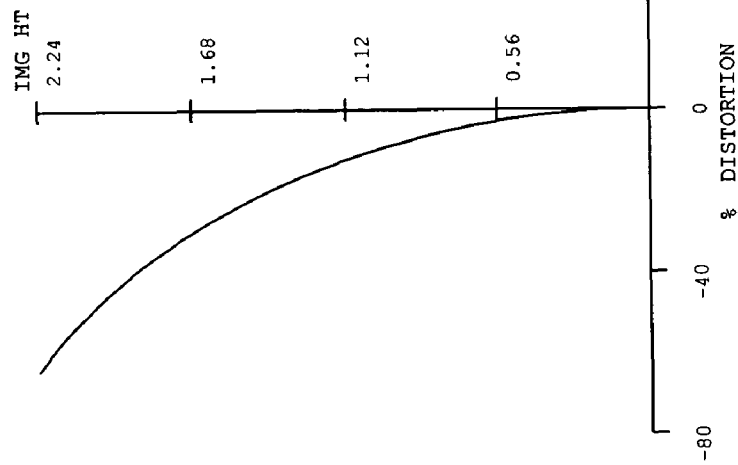
FIG. 6 shows Astigmatic field curvature of an image of another embodiment according to the present invention.
Figure 7:
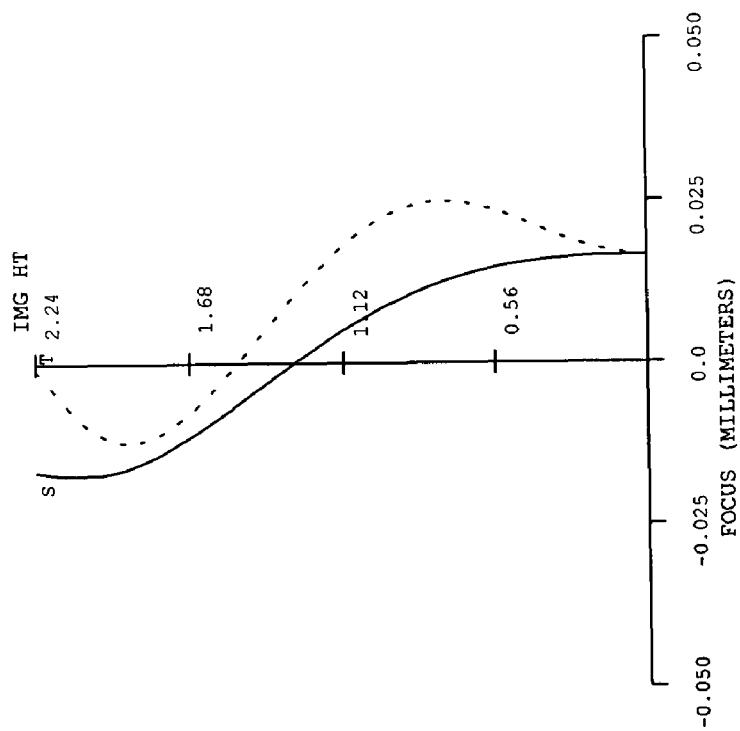
FIG. 7 shows distortion of an image of another embodiment according to the present invention.
Figure 8:
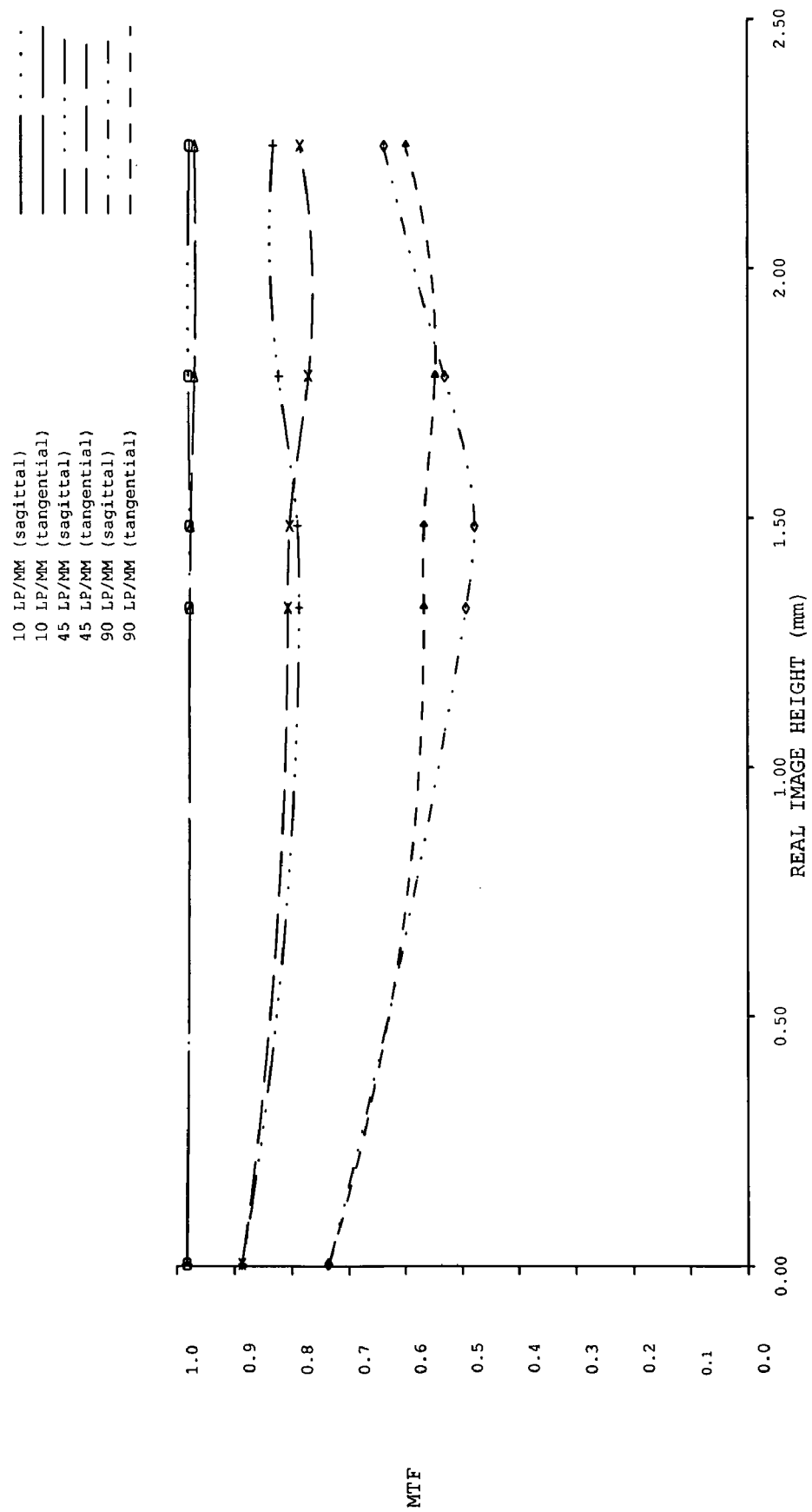
FIG. 8 shows a chart of 6 different Line pair per picture height ranging from 0 to 2.24 mm (vertical axis) vs MTF (Modulation transfer function) (horizontal axis) of another embodiment according to the present invention.
Figure 9:
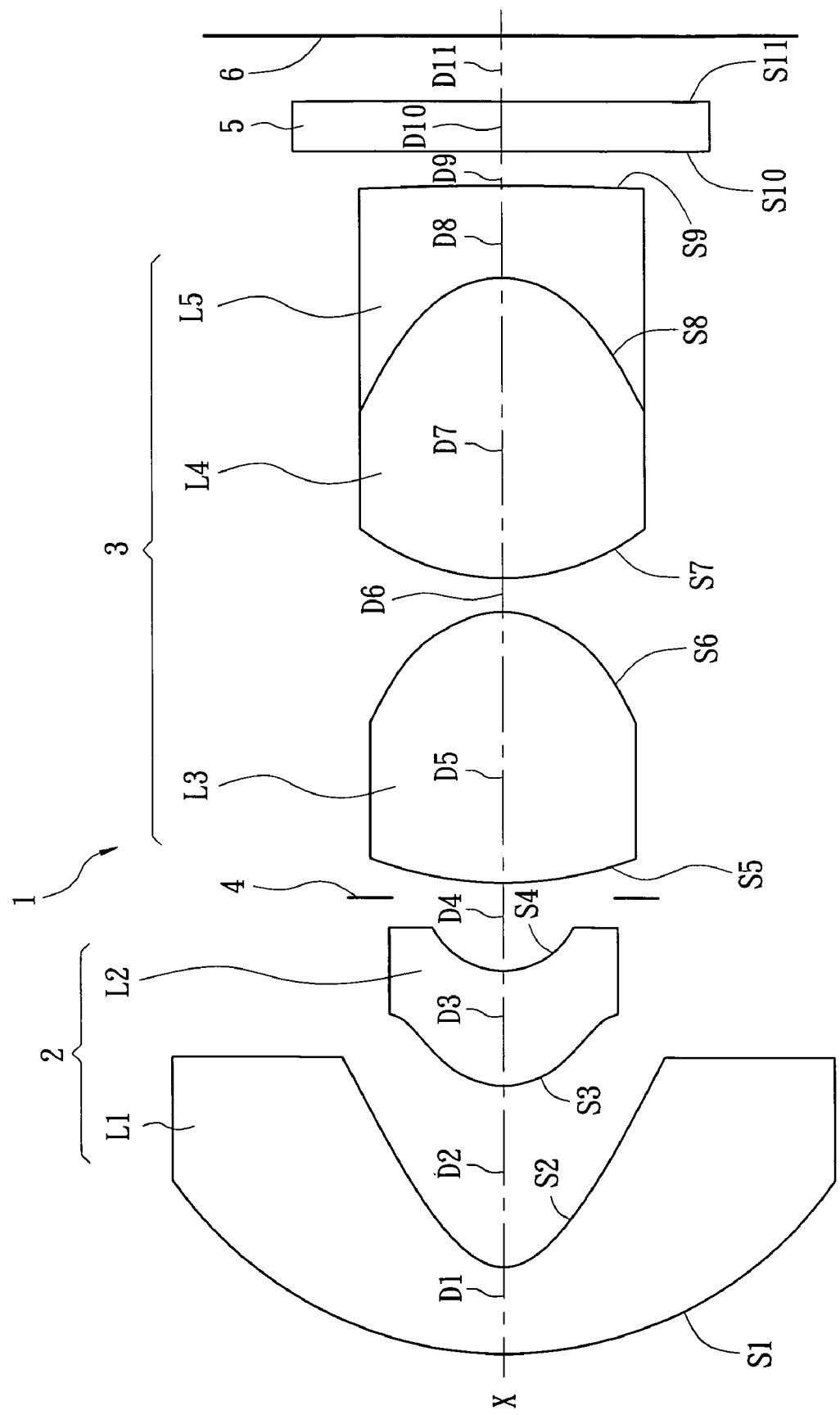
FIG. 9 is a schematic drawing of an optical structure of a third embodiment according to the present invention.
Figure 10:
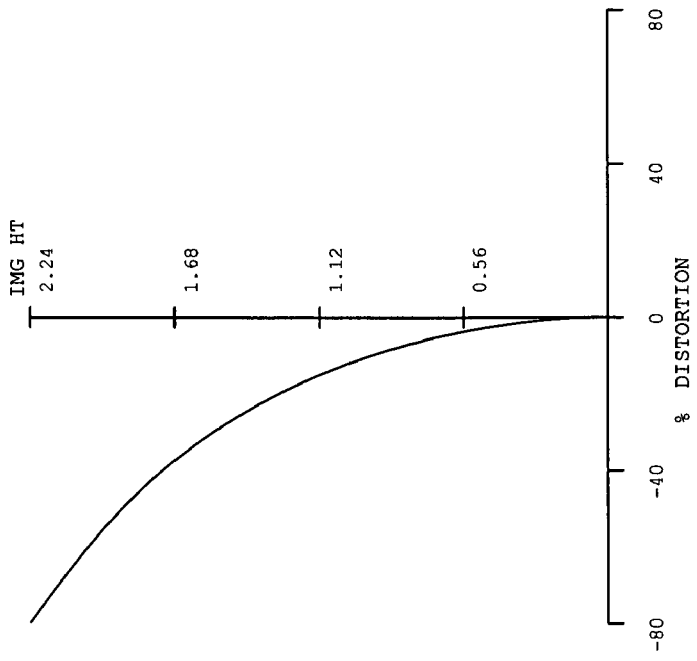
FIG. 10 shows Astigmatic field curvature of an image of a third embodiment according to the present invention.
Figure 11:
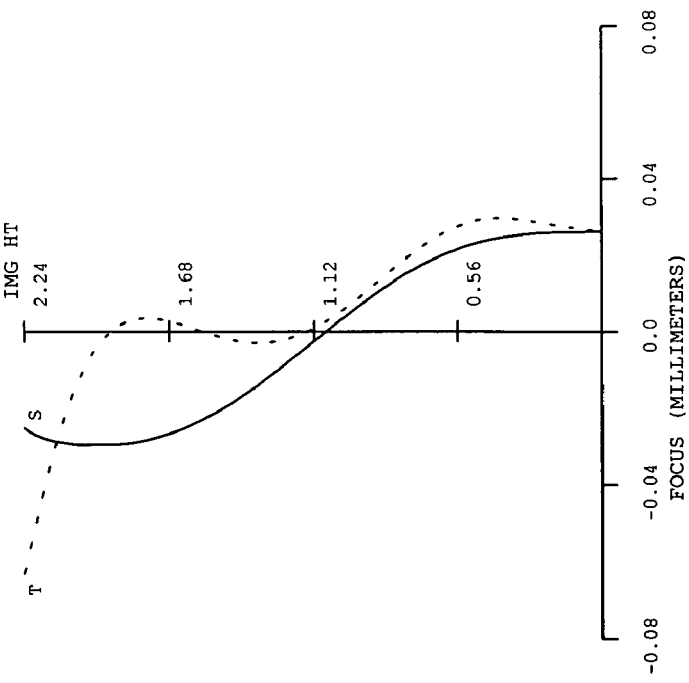
FIG. 11 shows distortion of an image of a third embodiment according to the present invention.
Figure 12:
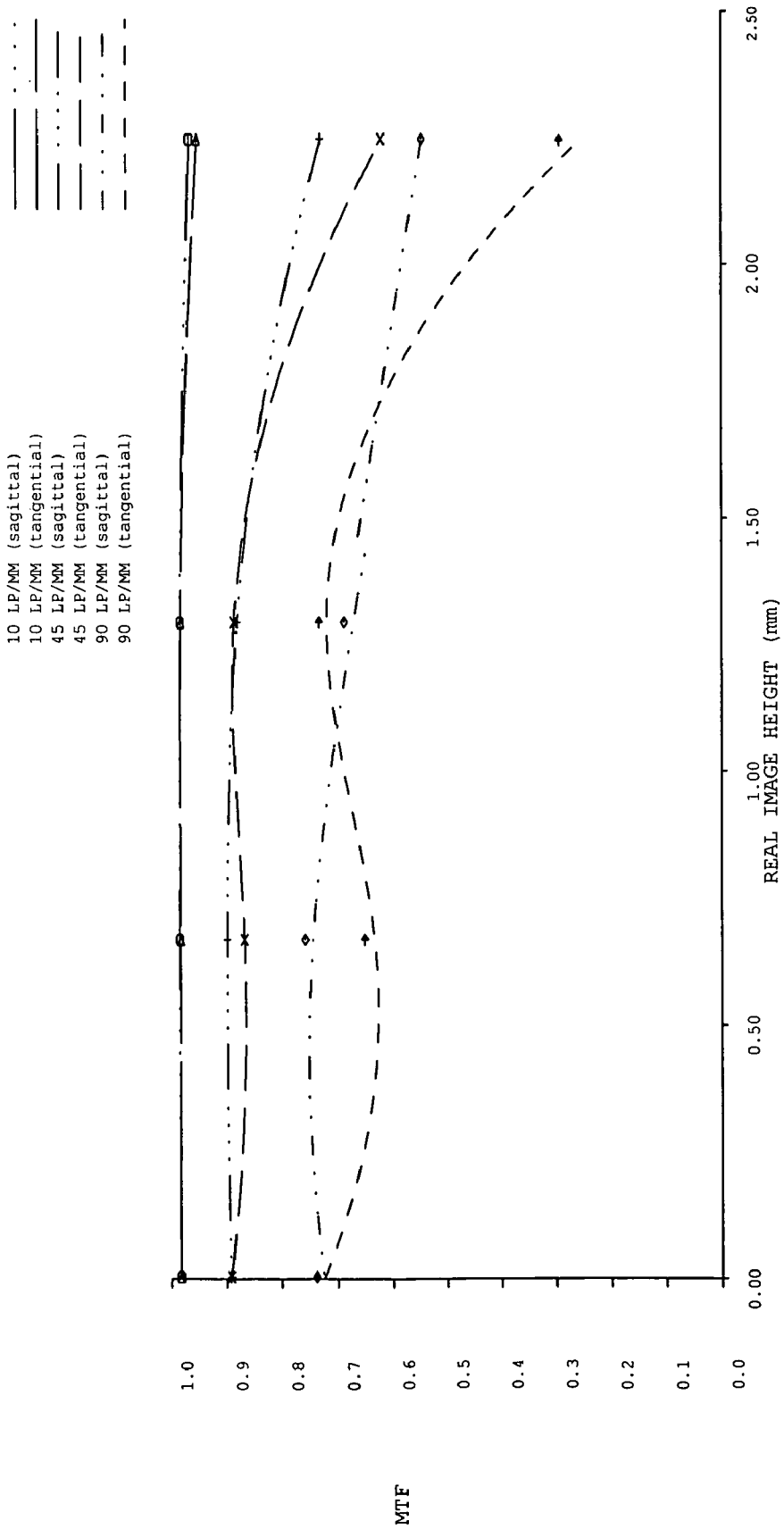
FIG. 12 shows a chart of 6 different Line pair per picture height ranging from 0 to 2.24 mm (vertical axis) vs MTF (Modulation transfer function) (horizontal axis) of a third embodiment according to the present invention.
Figure 13:
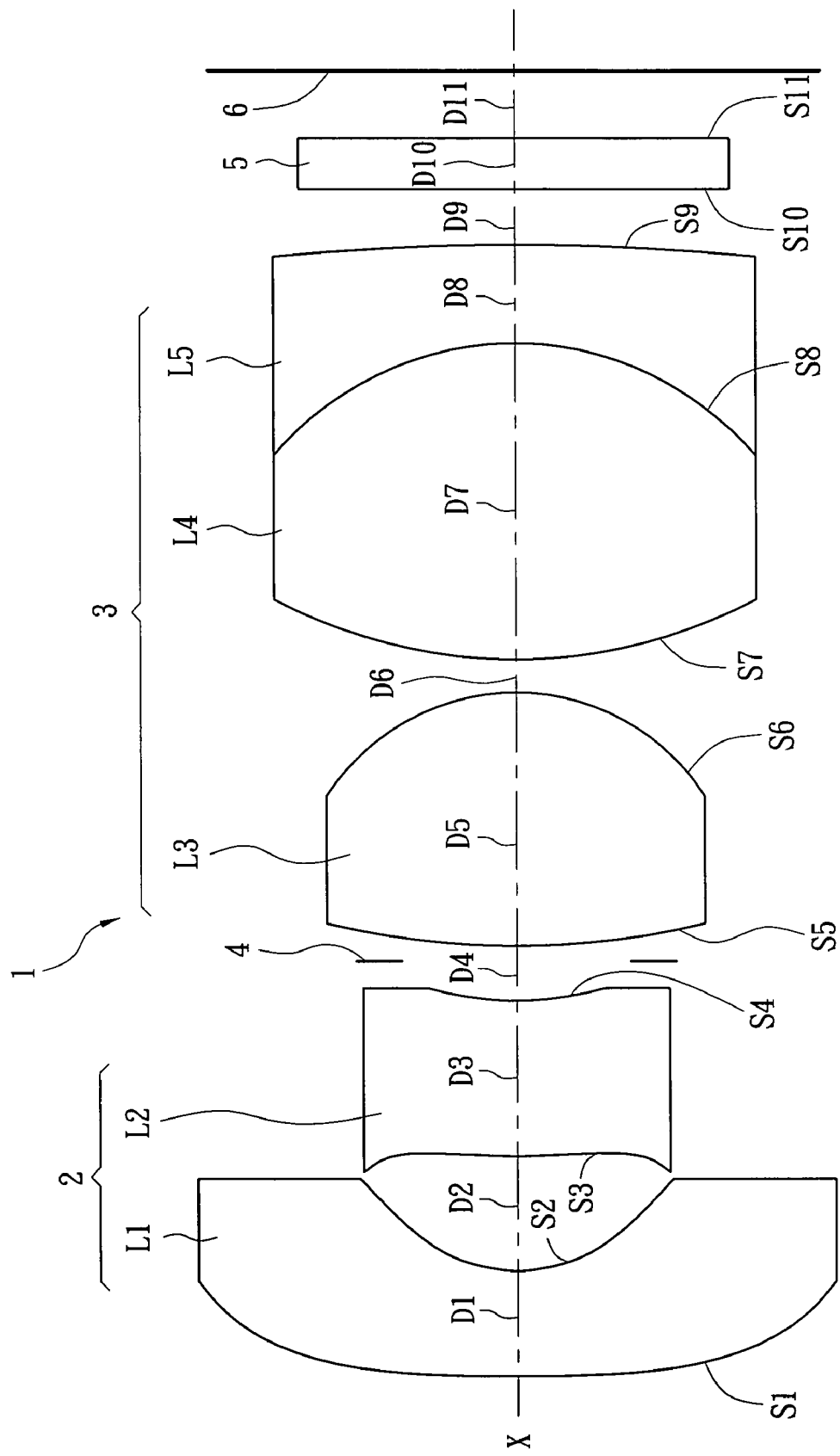
FIG. 13 is a schematic drawing of an optical structure of a fourth embodiment according to the present invention.
Figure 14:
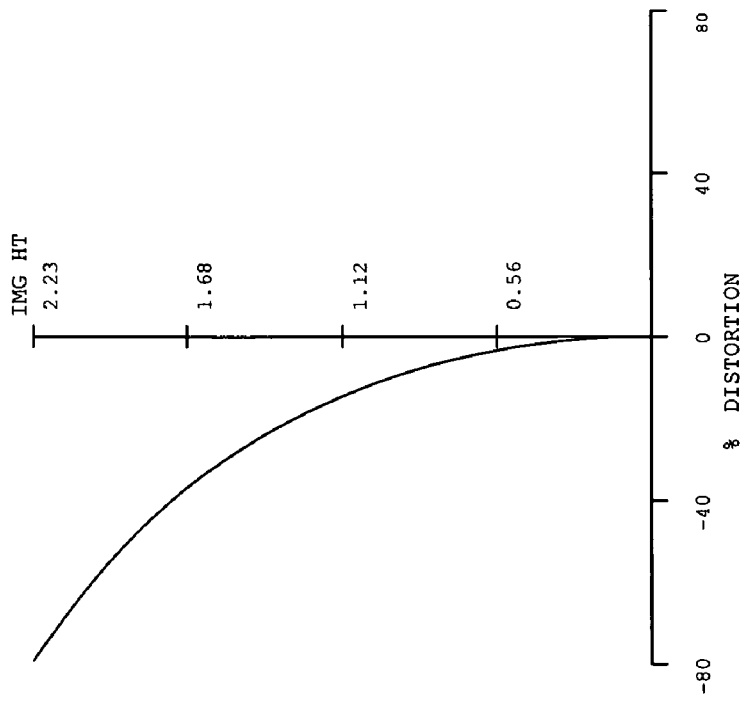
FIG. 14 shows Astigmatic field curvature of an image of a fourth embodiment according to the present invention.
Figure 15:
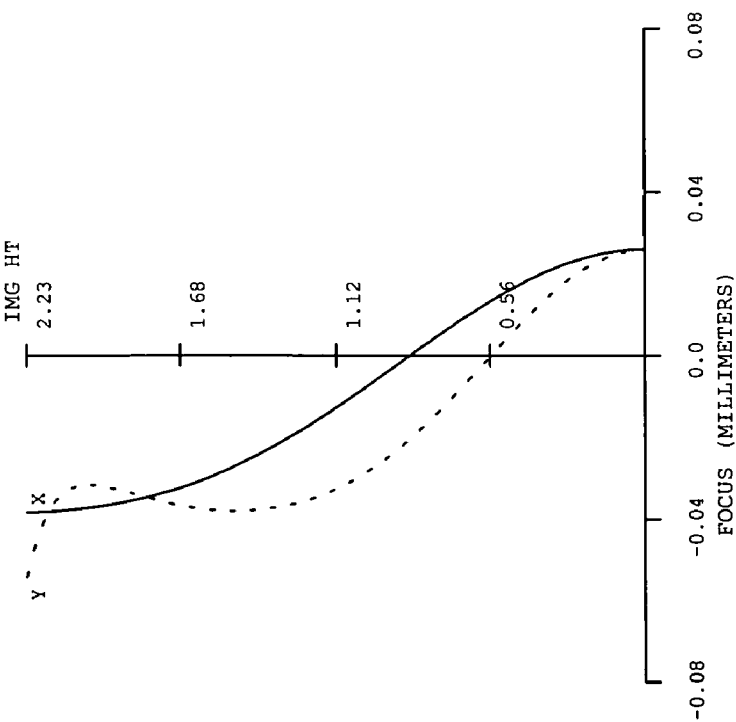
FIG. 15 shows distortion of an image of a fourth embodiment according to the present invention.
Figure 16:
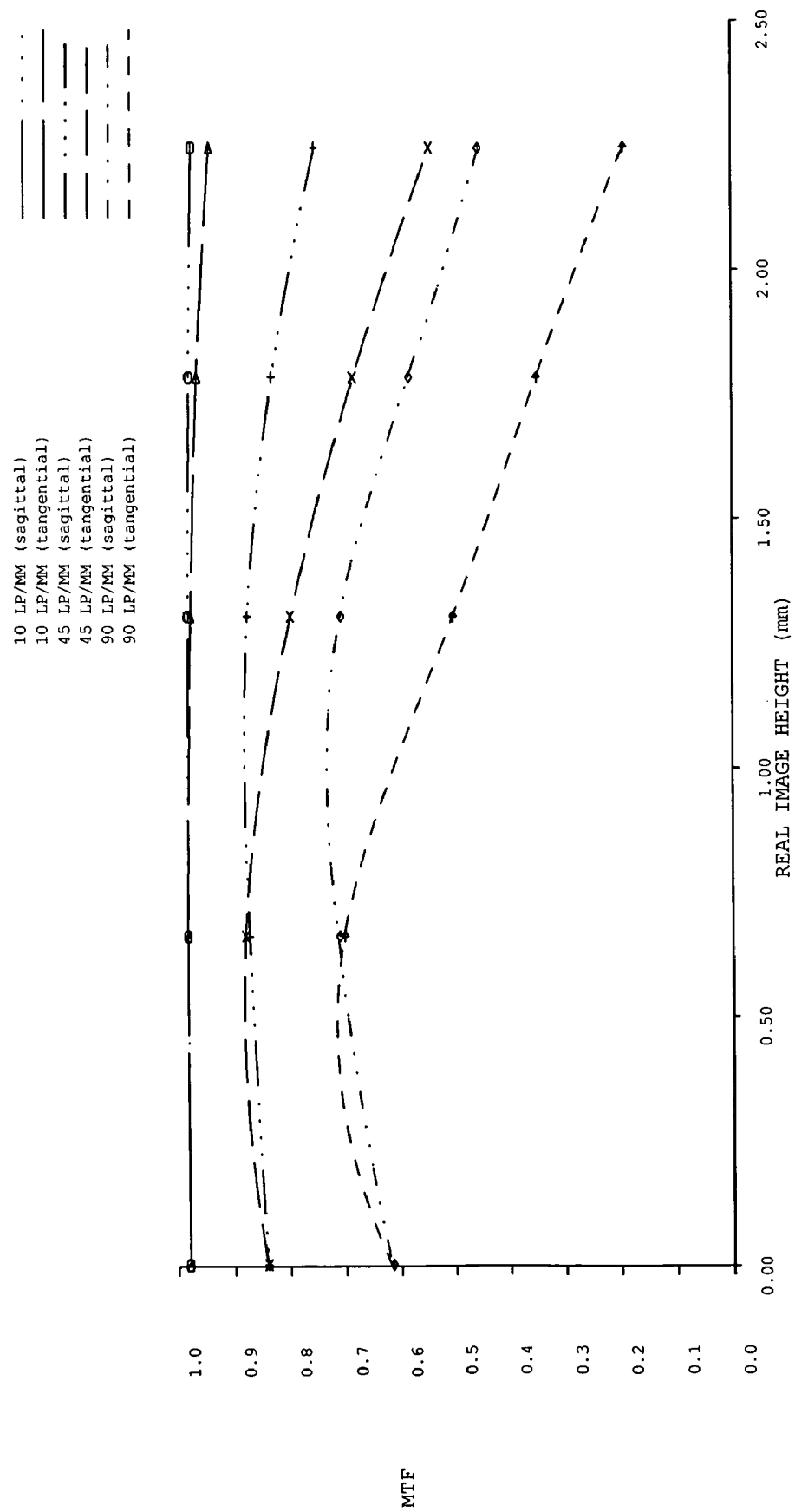
FIG. 16 shows a chart of 6 different Line pair per picture height ranging from 0 to 2.24 mm (vertical axis) vs MTF (Modulation transfer function) (horizontal axis) of a fourth embodiment according to the present invention.
Figure 17:
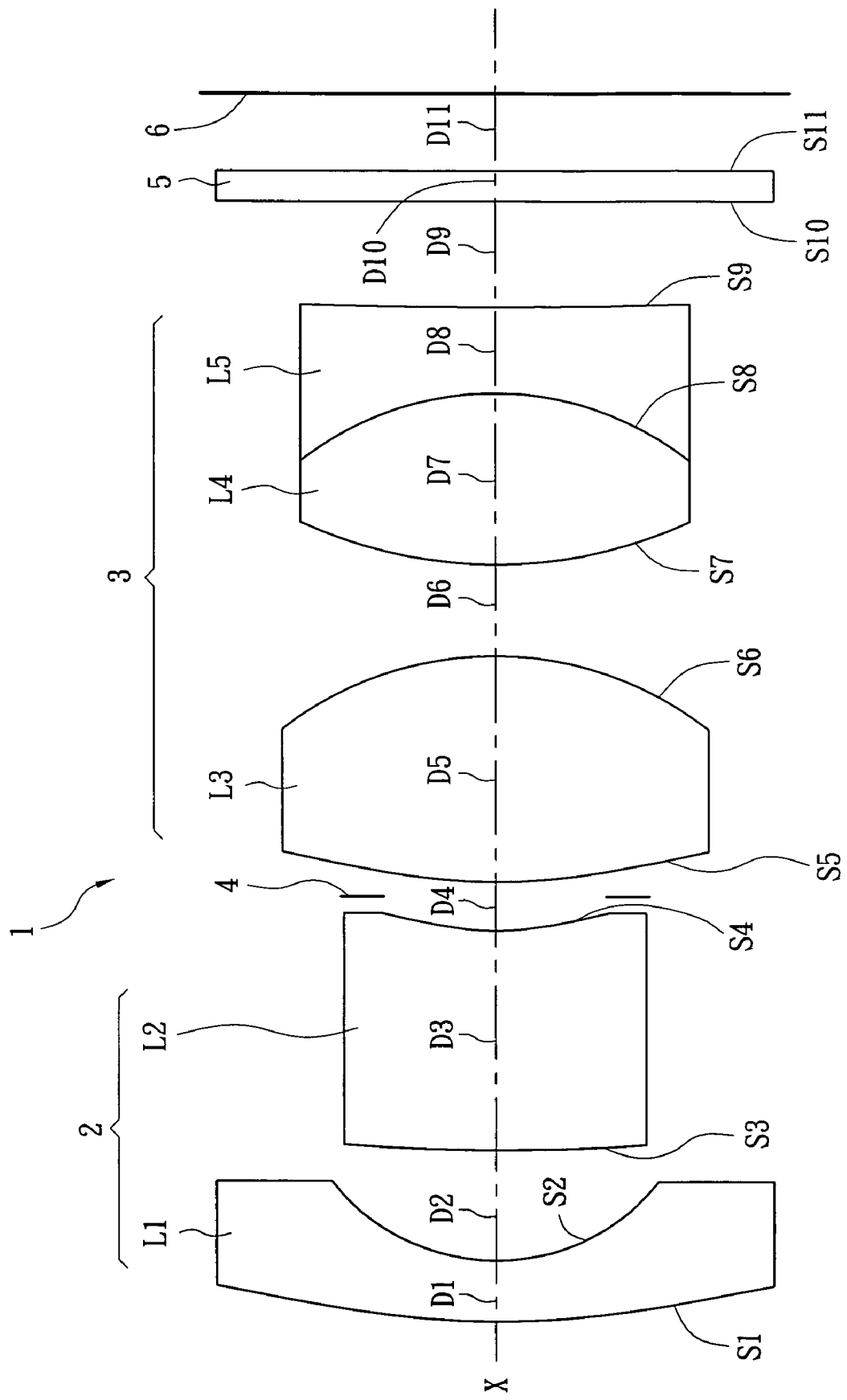
FIG. 17 is a schematic drawing of an optical structure of a fifth embodiment according to the present invention.
Figure 18:
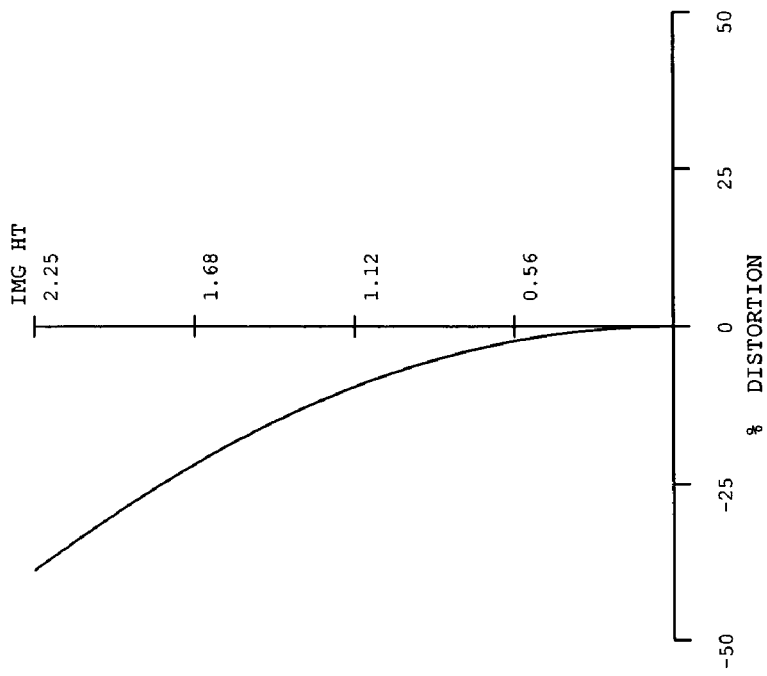
FIG. 18 shows Astigmatic field curvature of an image of a fifth embodiment according to the present invention.
Figure 19:
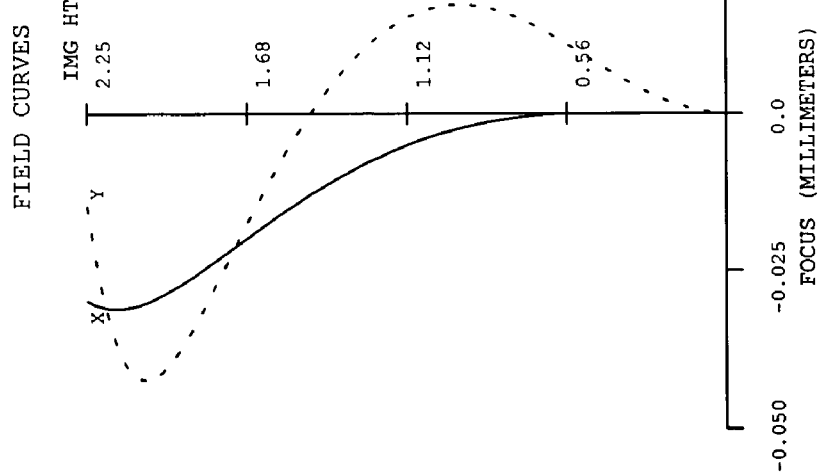
FIG. 19 shows distortion of an image of a fifth embodiment according to the present invention.
Figure 20:
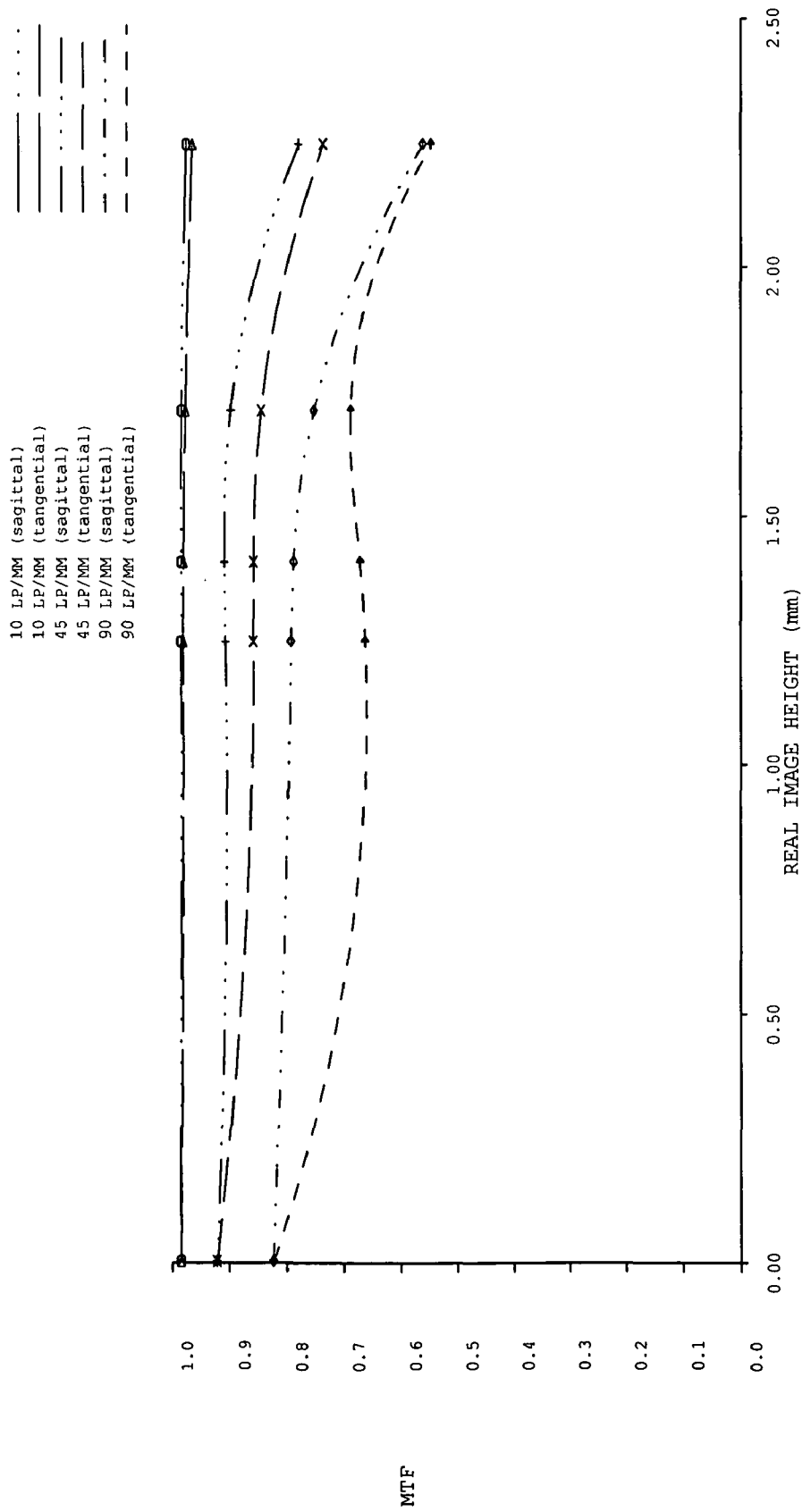
FIG. 20 shows a chart of 6 different Line pair per picture height ranging from 0 to 2.24 mm (vertical axis) vs MTF (Modulation transfer function) (horizontal axis) of a fifth embodiment according to the present invention.

Refer to FIG. 1, along an optical axis (X axis) in order from an object plane to an image plane, an image lens 1 according to the present invention includes: a first lens group 2 with a negative power (abbreviation: negative), a second lens group 3 with a positive power (abbreviation: positive), an IR cut-off filter 5 and an image sensing chip 6. From the object side to the image side, the first lens group 2 consists of a negative first lens L1 and a negative second lens L2 while the second lens group 3 includes a positive third lens L3, a positive fourth lens L4 and a negative fifth lens L5. In the negative first lens group 2, at least one of optical surfaces—S1, S2, S3, S4 of the first lens L1 and the second lens L2 is an aspherical optical surface. Moreover, in the second lens group 3, an image-side lens surface S8 of the positive fourth lens L4 is glued with an object-side lens surface (S8) of the negative fifth lens L5. While capturing images, light from objects passes from the first lens to the fifth lens (L1~L5) in sequence, then through the IR cut-off filter 5 to form an image on the image sensing chip 6.

The image lens 1 according to the present invention meets the following conditions:

$$2R2 > R4 > R2; \quad \text{equation (1)}$$

$$2|f12| < |f34| \quad \text{equation (2); and}$$

$$Vd1 > Vd2, Vd4 > Vd5; \quad \text{equation (3)}$$

wherein R2, R4 respectively represent curvature radius of the image-side lens surface S2, S4 of the negative first lens L1 and the negative second lens L2; f12, f34 respectively represent focal length of the negative first lens L1 and the negative second lens L2; Vd1, Vd2, Vd4, Vd5 respectively are Abbe numbers of the first lens L1, the second lens L2, the fourth lens L4, and the fifth lens L5.

A middle-positioned aperture is disposed on the image lens 1 so that an aperture stop 4 thereof is located between the first lens group 2 and the second lens group 3. It may be on the image-side lens surface S4 of the second lens L2, on the object-side lens surface S5 of the third lens L3, or between the above image-side lens surface S4 and the object-side lens surface S5.

A membrane is plated on an image-side lens surface of the lens prior to the image sensing chip 6 that's the image-side lens surface S9 of the fifth lens L5 so as to replace the IR cut-off filter 5.

The first lens L1 and the second lens L2 of the first lens group 2 are formed by plastic lens or molded glass lens while the third lens L3, the forth lens L4 and the fifth lens L5 of the second lens group 3 are formed by glass lens.

In the field of image lens systems of monitoring systems, especially the EDR (Event Data Recorder) such as car DVR (Digital Video Recorder), the image lens system 1 of the present invention has following advantages compared with prior arts: wide viewing angle that is at least 110°, small Fno, high brightness, high resolution, and effectively minimized length (through the lens, TTL) that is no more than 12 mm. Thus the image lens system 1 can be applied to ¼" (inch) CCD, CMOS or image sensing chips even smaller in size. Therefore, the applications and effects of the image lens system 1 are improved and especially suitable for lens of EDR such as DVR of car safety systems.

In the list one (1) of each embodiment, following parameters are shown sequentially-optical surfaces being numbered from the object side to the image side, curvature radius of each optical (lens) surface on the optical axis and the unit is mm, wherein the image-side lens surface S8 of the fourth lens L4 is equal to the object-side lens surface S8 of the fifth lens L5; distance between the two lens surfaces and the unit is mm; refractive index (Nd) of each lens, Abbe number (Vd) of each lens, focal length of each lens (F12 is the focal length of the first lens L1, F789 is the focal length of the glued fourth lens L4 and the fifth lens L5), focal length of each lens group (for example, Fg1 is the focal length of the first lens group 2 and Fg2 is the focal length of the second lens group 3), and systemic effective focal length of the image lens system 1. Moreover, in the list two (2) of each embodiment, coefficients of each aspherical surface on optical surfaces of the first lens L1 or the second lens L2 are shown and each aspherical surface is defined by the following equation:

The form of conic and asphere surfaces is as follows:

$$z = \frac{ch^2}{1 + SQRT[1-(1+k)c^2h^2]} + Ah^4 + Bh^6 + Ch^8 + Dh^{10} + Eh^{12} + Fh^{14} + Gh^{16} + Hh^{18} + Jh^{20}$$

wherein z is a sag value, c is curvature, h is lens height, K is Conic Constant, A, B, C, D, E, F, J respectively are $4^{th}$~$20^{th}$ order Aspherical Coefficient.

Embodiment one, refer from FIG. 1 to FIG. 4.

| | | | List (1) | | | | | |
|---|---|---|---|---|---|---|---|---|
| Surface | Raduis | Distance | Nd | Vd | | | | |
| S1 | R1 | 13.170 | 0.70 | 1.543 | 55.5 | F12 = −3.638 | Fg1 = −2.527 | f = 2.294 |
| S2 | R2 | 1.686 | 0.54 | | | | | |
| S3 | R3 | 3.733 | 0.40 | 1.585 | 30 | F34 = −10.99 | | |
| S4 | R4 | 2.268 | 0.15 | | | | | |
| S5 | R5 (stop) | 9.677 | 1.69 | 1.697 | 55.4 | F56 = 2.424 | Fg2 = 1.867 | |
| S6 | R6 | −1.900 | 0.05 | | | | | |
| S7 | R7 | 4.518 | 1.92 | 1.697 | 55.4 | F789 = 8.539 | | |
| S8 | R8 | −2.000 | 0.50 | 1.847 | 23.8 | | | |
| S9 | R9 | −27.377 | 0.76 | | | | | |
| S10 | | ∞ | 0.30 | 1.517 | 64.2 | | | |
| S11 | | ∞ | 1.00 | | | | | |
| Image | | ∞ | 0.00 | | | | | |

| | List (2) | | | | |
|---|---|---|---|---|---|
| Asphere Surface | | | | | |
| | K | A | B | C | D |
| S1 | −411.03278 | 0.01050 | | | |
| S2 | 1.36376 | −0.03758 | | | |
| S3 | −15.66895 | −0.13456 | 0.00085 | | |
| S4 | 3.66812 | −0.16242 | −0.00556 | | |

It is learned from the list (1) that this embodiment satisfies the above equation (1), equation (2), and equation (3). The length (TTL) is 8 mm, the wide angle is 140°. The first and the second lenses L1, L2 are plastic lenses while the third, the fourth, and the fifth lenses L3, L4, L5 are glass lenses.

Embodiment two, refer from FIG. 5 to FIG. 8.

List (1)

| Surface | Raduis | | Distance | Nd | Vd | | | |
|---|---|---|---|---|---|---|---|---|
| S1 | R1 | 50.571 | 0.500 | 1.543 | 55.5 | F12 = −3.570 | Fg1 = −2.194 | f = 2.278 |
| S2 | R2 | 1.861 | 0.717 | | | | | |
| S3 | R3 | 9.888 | 1.741 | 1.607 | 27 | F34 = −9.780 | | |
| S4 | R4 | 3.463 | 0.177 | | | | | |
| S5 | R5 (stop) | 6.380 | 1.954 | 1.744 | 44.9 | F56 = 2.781 | Fg2 = 2.097 | |
| S6 | R6 | −2.663 | 0.196 | | | | | |
| S7 | R7 | 4.453 | 2.370 | 1.696 | 55.4 | F789 = 9.179 | | |
| S8 | R8 | −2.400 | 0.700 | 1.846 | 23.8 | | | |
| S9 | R9 | −498.956 | 0.840 | | | | | |
| S10 | | ∞ | 0.300 | 1.517 | 64.1 | | | |
| S11 | | ∞ | 1.000 | | | | | |
| Image | | ∞ | 0.000 | AIR | | | | |

List (2)

Asphere Surface

| | k | A | B | C | D |
|---|---|---|---|---|---|
| S1 | 330.27761 | 0.00634 | −0.00034 | | |
| S2 | 0.71282 | −0.00519 | | | |
| S3 | −181.15144 | −0.00771 | −0.00606 | | |
| S4 | 4.10321 | −0.02015 | −0.00199 | | |

It is learned from the list (1) that this embodiment satisfies the above equation (1), equation (2), and equation (3). The length (TTL) is 10.5 mm, the wide angle is 150°. The first and the second lenses L1, L2 are plastic lenses while the third, the fourth, and the fifth lenses L3, L4, L5 are glass lenses.

Embodiment three, refer from FIG. 9 to FIG. 12.

List (1)

| Surface | Raduis | | Distance | Nd | Vd | | | |
|---|---|---|---|---|---|---|---|---|
| S1 | R1 | 8.720 | 0.50 | 1.485 | 70.1 | F12 = −3.738 | Fg1 = −2.422 | f = 1.933 |
| S2 | R2 | 1.472 | 1.25 | AIR | | | | |
| S3 | R3 | 2.243 | 0.67 | 1.800 | 40.8 | F34 = −13.74 | | |
| S4 | R4 | 1.615 | 0.41 | | | | | |
| S5 | R5 (stop) | 11.394 | 1.93 | 1.697 | 55.4 | F56 = 2.54 | Fg2 = 1.969 | |
| S6 | R6 | −1.950 | 0.16 | AIR | | | | |
| S7 | R7 | 4.549 | 1.78 | 1.697 | 55.4 | F789 = 8.879 | | |
| S8 | R8 | −2.000 | 0.50 | 1.847 | 23.8 | | | |
| S9 | R9 | −30.882 | 0.80 | AIR | | | | |
| S10 | | ∞ | 0.30 | 1.517 | 64.2 | | | |
| S11 | | ∞ | 0.90 | AIR | | | | |
| Image | | ∞ | 0.00 | AIR | | | | |

List (2)

Asphere Surface

| | K | A | B | C | D |
|---|---|---|---|---|---|
| S1 | −93.51297 | 0.00129 | 0.00004 | | |
| S2 | −0.84112 | 0.00364 | 0.00312 | | |
| S3 | −0.94697 | −0.01272 | −0.02689 | | |
| S4 | 0.86575 | −0.02960 | −0.04753 | | |

It is learned from the list (1) that this embodiment satisfies the above equation (1), equation (2), and equation (3). The length (TTL) is 9.2 mm, the wide angle is 175°. The first and the second lenses L1, L2 are molded glass lenses while the third, the fourth, and the fifth lenses L3, L4, L5 are glass lenses.

Embodiment four, refer from FIG. 13 to FIG. 16.

List (1)

| Surface | Raduis | | Distance | Nd | Vd | | | |
|---|---|---|---|---|---|---|---|---|
| S1 | R1 | 57.255 | 0.500 | 1.514 | 57 | F12 = −2.95 | Fg1 = −1.806 | f = 1.903 |
| S2 | R2 | 1.473 | 1.033 | | | | | |
| S3 | R3 | 6.345 | 1.381 | 1.607 | 27 | F34 = −9.027 | | |
| S4 | R4 | 2.699 | 0.382 | | | | | |
| S5 | R5 (stop) | 6.592 | 1.803 | 1.567 | 42.8 | F56 = 2.792 | Fg2 = 2.151 | |
| S6 | R6 | −1.879 | 0.080 | | | | | |
| S7 | R7 | 4.978 | 1.771 | 1.697 | 55.4 | F789 = 8.317 | | |
| S8 | R8 | −1.850 | 0.500 | 1.847 | 23.7 | | | |
| S9 | R9 | −14.300 | 0.050 | | | | | |
| S10 | | ∞ | 0.800 | 1.517 | 64.2 | | | |
| S11 | | ∞ | 2.200 | | | | | |
| Image | | ∞ | 0.000 | | | | | |

List (2)

Asphere Surface

| | K | A | B | C | D |
|---|---|---|---|---|---|
| S1 | 229.65535 | 0.00109 | 0.00005 | | |
| S2 | −1.01263 | 0.02621 | 0.00654 | | |
| S3 | 14.99646 | −0.01753 | −0.01521 | | |
| S4 | 5.43959 | −0.00164 | −0.02804 | | |

List (2)

Asphere Surface

| | K | A | B | C | D |
|---|---|---|---|---|---|
| S1 | 114.90755 | 0.0050821 | 0.00006 | | |
| S2 | 0.55265 | −0.0058137 | | | |
| S3 | −66.76446 | −0.0022212 | −0.00377 | | |

It is learned from the list (1) that this embodiment satisfies the above equation (1), equation (2), and equation (3). The length (TTL) is 10.5 mm, the wide angle is 170°. The first and the second lenses L1, L2 are plastic lenses while the third, the fourth, and the fifth lenses L3, L4, L5 are glass lenses.

Embodiment five, refer from FIG. 17 to FIG. 20.

List (1)

| Surface | Raduis | | Distance | Nd | Vd | | | |
|---|---|---|---|---|---|---|---|---|
| S1 | R1 | 31.5368 | 0.58 | 1.543 | 55.5 | | | |
| S2 | R2 | 1.9734 | 0.86 | | | F12 = −3.903 | Fg1 = −2.29 | f = 2.462 |
| S3 | R3 | 7.7013 | 2.03 | 1.607 | 27 | | | |
| S4 | R4 | 3.1242 | 0.37 | | | F34 = −10.39 | | |
| S5 | R5 (stop) | 6.3582 | 2.15 | 1.744 | 44.9 | | | |
| S6 | R6 | −2.8769 | 0.98 | | | F56 = 2.95 | Fg2 = 2.45 | |
| S7 | R7 | 4.7313 | 1.59 | 1.696 | 55.4 | | | |
| S8 | R8 | −2.5846 | 0.81 | 1.846 | 23.8 | F789 = 10.68 | | |
| S9 | R9 | 186.0000 | 0.98 | | | | | |
| S10 | | ∞ | 0.30 | 1.517 | 64.1 | | | |
| S11 | | ∞ | 1.34 | | | | | |
| Image | | ∞ | 0.00 | AIR | | | | |

It is learned from the list (1) that this embodiment satisfies the above equation (1), equation (2), and equation (3). The length (TTL) is 12 mm, the wide angle is 110°. The first and the second lenses L1, L2 are plastic lenses while the third, the fourth, and the fifth lenses L3, L4, L5 are glass lenses.

In summary, refer to FIG. 4, FIG. 8, FIG. 12, FIG. 16, FIG. 20, these embodiments (first to fifth) have MTF response of 80% and the wide angle are respectively 140°, 150°, 175°, 170°, and 110°. Thus the image lens system of the present invention do have wide angle no less than 110° and high resolution.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A five-lens image lens system, along an optical axis from an object plane to an image plane, comprising:
    first lens group with a negative power having a negative first lens, a negative second lens from the object plane to the image plane;
    a second lens group with a positive power having a positive third lens, a positive fourth lens and a negative fifth lens from the object plane to the image plane while an image-side lens surface of the positive fourth lens is glued with an object-side lens surface of the negative fifth lens;
    an IR cut-off filter 5; and
    a image sensing chip;
    wherein the five-lens image lens system satisfied the conditions:

$2R2 > R4 > R2;$ $2|f12| < |f34|;$ and $Vd1 > Vd2, Vd4 > Vd5;$ wherein R2, R4 respectively represent curvature radius of the image-side lens surface of the negative first lens and the negative second lens; f12, f34 respectively represent focal length of the negative first lens and the negative second lens; Vd1, Vd2, Vd4, Vd5 respectively are Abbe numbers of the first lens, the second lens, the fourth lens, and the fifth lens.

2. The device as claimed in claim 1, wherein at least one of an object-side lens surface and an image-side lens surface of the first lens is an aspherical surface.

3. The device as claimed in claim 1, wherein at least one of an object-side lens surface and an image-side lens surface of the second lens is an aspherical surface.

4. The device as claimed in claim 1, wherein a middle-positioned aperture is disposed on the five-lens image lens system so that an aperture stop of the middle-positioned aperture is located between the first lens group and the second lens group.

5. The device as claimed in claim 4, wherein the middle-positioned aperture is on the image-side lens surface of the second lens.

6. The device as claimed in claim 4, wherein the middle-positioned aperture is on the object-side lens surface of the third lens.

7. The device as claimed in claim 4, wherein the middle-positioned aperture is between the image-side lens surface of the second lens and the object-side lens surface of the third lens.

8. The device as claimed in claim 1, wherein the first lens is a plastic lens.

9. The device as claimed in claim 1, wherein the first lens is a molded glass lens.

10. The device as claimed in claim 1, wherein the second lens is a plastic lens.

11. The device as claimed in claim 1, wherein the second lens is a molded glass lens.

12. The device as claimed in claim 1, wherein surface of the third lens is a spherical surface.

13. The device as claimed in claim 1, wherein surface of the third lens is an aspherical surface.

* * * * *